UNITED STATES PATENT OFFICE.

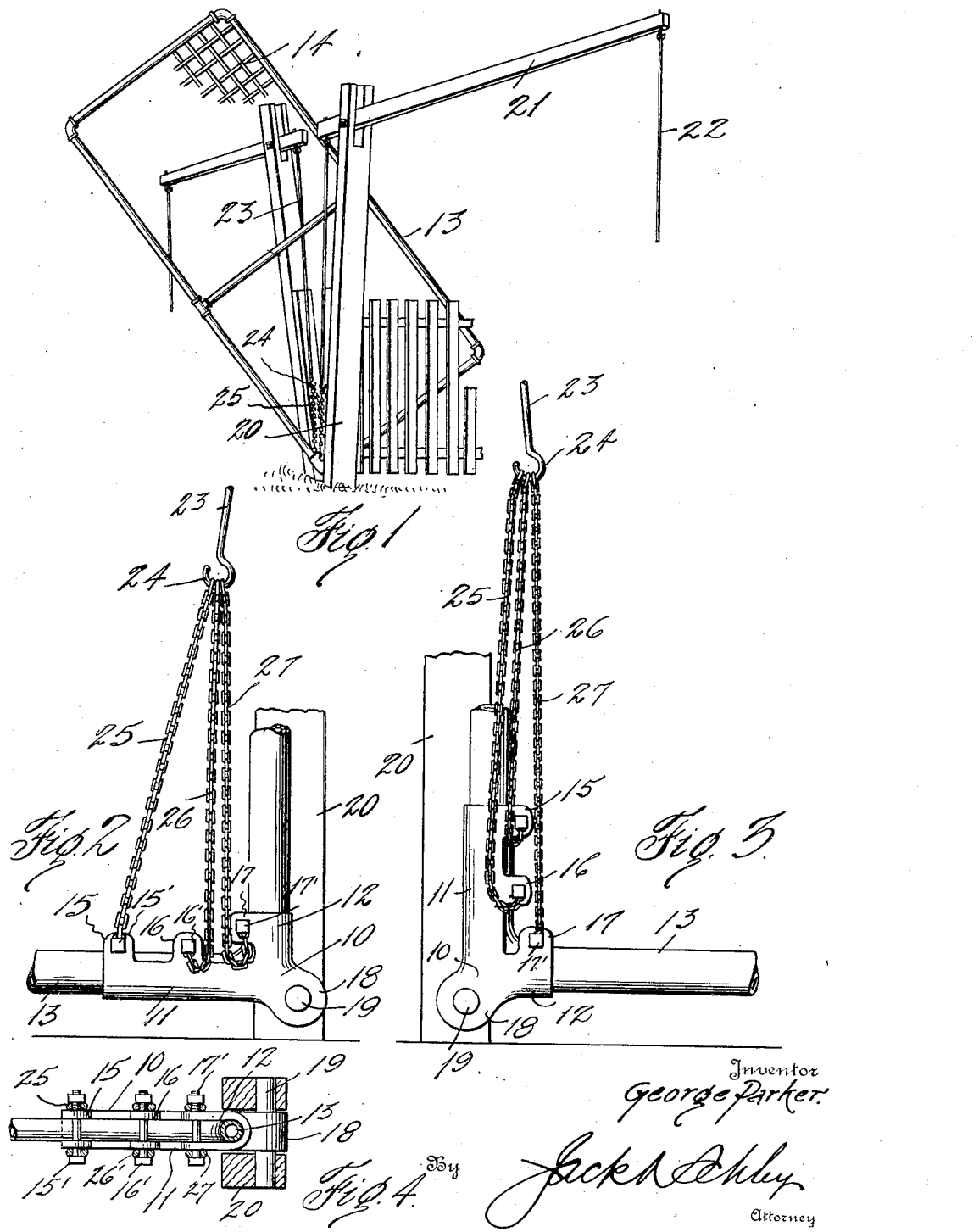

GEORGE PARKER, OF HOT SPRINGS, ARKANSAS.

GATE-OPENING DEVICE.

1,362,133. Specification of Letters Patent. Patented Dec. 14, 1920.

Application filed February 16, 1920. Serial No. 359,159.

*To all whom it may concern:*

Be it known that I, GEORGE PARKER, a citizen of the United States, residing at Hot Springs, in the county of Garland and State of Arkansas, have invested certain new and useful Improvements in Gate-Opening Devices, of which the following is a specification.

This invention relates to new and useful improvements in gate opening devices.

The object of the invention is to provide a simple and superior gate opening device which will involve few parts that perform their functions in an orderly and highly satisfactory manner. The aim is toward simplicity, compactness, durability and stability.

In carrying out the invention a swinging bracket is provided for supporting one of the lower corners of the gate to which it is securely fastened. Means for swinging the bracket and thus the gate involves a plurality of flexible connections which are attached to the bracket in such a manner as to come into operation at the points in the elevation of the gate at which they will most efficiently serve their purpose, and whereby the gate is easily raised and lowered.

The invention will be more readily understood from a reading of the following specification and by reference to the accompanying drawings, in which an example of the invention is shown, and wherein:

Figure 1 is a perspective view of a gate opening device constructed in accordance with this invention, and showing the gate raised, Fig. 2 is a side elevation of a portion of the gate opening device with the gate in its closed position, Fig. 3 is a similar view with the gate fully open, and Fig. 4 is a horizontal cross-sectional detail of the gate swinging bracket.

In the drawings the numeral 10 designates a gate swinging bracket having a horizontal member 11 and an upright member 12 at substantially right angle thereto. These members are substantially U-shaped in cross section and form a socket for the reception for the lower corner of the gate 13. The gate is of the usual pipe construction with a foraminous panel 14 and forms no particular part of the invention.

The member 11 has at its outer ends a pair of upstanding ears 15 and at its central portion a second pair of upstanding ears 16; while the member 12 has at its upper ends a pair of inwardly directed ears 17. Bolts 15′ 16′ and 17′ are fastened in the ears respectively and act to hold the gate in the bracket. A boss 18 extends diagonally downward from the inner section of the members 11 and 12. Trunnions 19 project laterally from each side of this boss and suitably engage in upright posts 20 which are fastened in the ground. These trunnions form pivots on which the gate is swung. It will be noticed that the bracket 10 is simple and compact in construction and may be cast in one piece if desired.

The upper ends of the posts 20 are slotted and receive operating levers 21 having flexible connections 22 at their outer ends, and being pivoted in the posts near their inner ends. Links 23 are pivotally suspended from the inner ends of the levers between the posts on each side of the gate and each link has a hook 24 at its lower end. A chain 25 depends from each hook 24 and has its lower end connected to one end of the bolt 15′. A second chain 26 depends from each hook and has its lower end connected with a bolt 16′; while a third chain 27 depends from each hook and has its lower end attached to the bolt 17′. When the gate is lowered or in its closed position both the chains 26 and 27 are slack and a pull on either lever 21 is transmitted to the chain 25 connected with that particular lever so that the initial swing or elevation of the gate is instituted by pulling on the chain 25. When the gate has been raised about two-thirds of the way the pull is transferred to the chain 26, and the chain 25 becomes slack. The chain 26 carries the gate over the center.

As the gate passes over the center the load is transferred to the chain 27 which acts to limit the downward movement or swing of the gate so that the opening movement is completed in an easy and steady manner as will be obvious from Fig. 3. When it is desired to close the gate it is merely necessary to pull on either lever 21, whereby the bracket is swung through the agency of the chain 27 connected with that particular lever and elevated and formed over the center. After the gate passes the center and starts to swing down the load is first carried by the chain 26 and finally by the chain 25. It will be seen that the operation is easy and steady and free from jerks. The whole device may be easily installed without the aid of a skilled mechanic and is permanent and durable.

What I claim is:

1. In a gate opening device, the combination with a support and operating levers, of a swinging bracket hinged on the support, and a plurality of flexible connections attached to the bracket at different points on each side of its pivot point and each connection individually sustaining in succession the load at a predetermined period of the swing of the gate.

2. In a gate opening device, the combination with a support and operating levers, of a swinging bracket having pivot points engaging in the support, pivoted links depending from the levers and each having a hook at its lower ends, and separate chains depending from the hook of the link on each side of the gate and attached to the bracket at different points on one side of its pivot point and each chain individually sustaining in succession the load at a predetermined period of the swing of the gate while the other chains are slack.

3. In a gate opening device, the combination with a support and operation means, of a swinging bracket comprising right angular members and pivoted on said supports, a pair of chains attached at different points on each side of one of the members of the bracket, and another pair of chains attached to the other member of the bracket, said chains being connected with the operating means and sustaining the load in succession at different intervals during the swing of the gate.

4. In a gate opening device, a substantially vertically swinging bracket adapted for connection with the gate and being substantially L-shaped and U-shaped in cross section for receiving one corner of the gate, a pivot boss projecting from the bracket and having pivot trunnions, means to support the pivot trunnions so that the bracket is adapted to swing in a substantially vertical plane, a link arranged above the pivot trunnions, means to move the link vertically, and a plurality of separate flexible elements connected with the link and attached to the bracket at spaced points, each element serving in succession to carry the load of the gate while the other elements are slack.

5. In a gate opening device, a swinging bracket comprising members disposed at an angle to each other and shaped to receive a gate, a pivot boss extending from the intersection of the members and having trunnions on each side, ears provided at each end of each member of the bracket and another pair of ears intermediate the ends of one of the members, bolts passing through the ears and fastening the gate in the bracket, chains extending from each end of each bolt, two of the chains being inactive when the gate is opened or closed, and a pair of links each having a hook at its lower end on which the chains on its side of the gate are engaged.

6. The combination with a post, of a vertically swinging gate pivoted at one corner, a link arranged above the pivot, means to move the link vertically, a plurality of separate flexible and non-extensible elements connected with the link and attached to the lower portion of the gate at spaced points upon the same side of the pivot of the gate, each element serving in succession to carry the load of the gate while the other elements are slack.

7. The combination with a post, of a vertically swinging gate pivoted at one corner, said corner embodying longitudinal and transverse portions, a vertically movable element arranged above the gate, and a plurality of separate flexible elements connected with the vertically movable element, certain of the flexible elements being connected with the longitudinal portion of the corner at spaced points and one of the flexible elements being connected with the transverse portion of the corner at a point spaced from the first named point, all of said points of connection being upon the same side of the pivot, each of said flexible elements serving in succession to carry the load of the gate while the other flexible elements are slack.

In testimony whereof I affix my signature.

GEORGE PARKER.